Oct. 7, 1941.  S. MORICI ET AL  2,257,755
HEATER FOR INTERNAL COMBUSTION ENGINE COOLING WATER
Filed Feb. 9, 1939  4 Sheets-Sheet 1
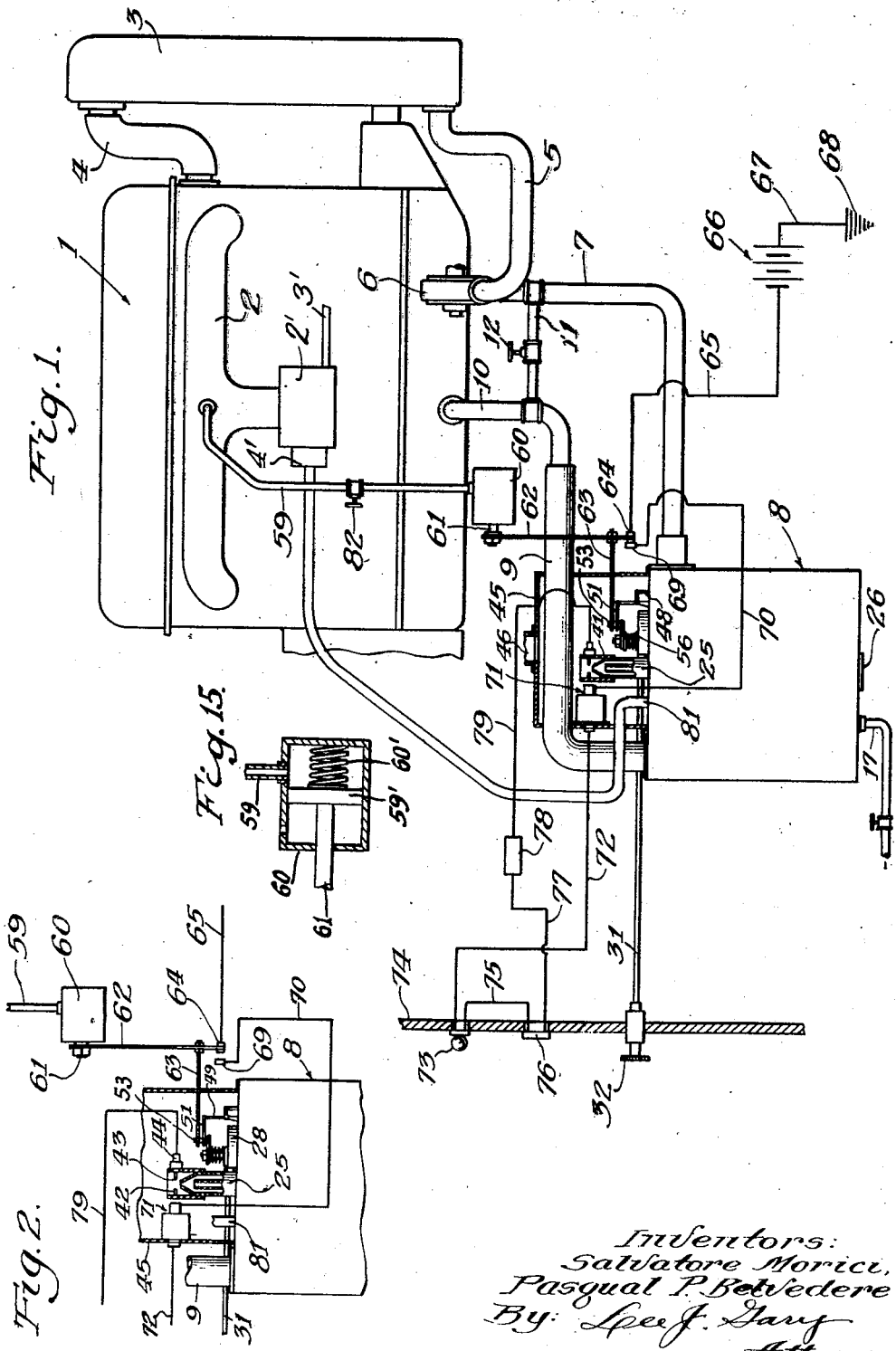
Inventors:
Salvatore Morici,
Pasqual P. Belvedere
By: Lee J. Gary
Attorney.

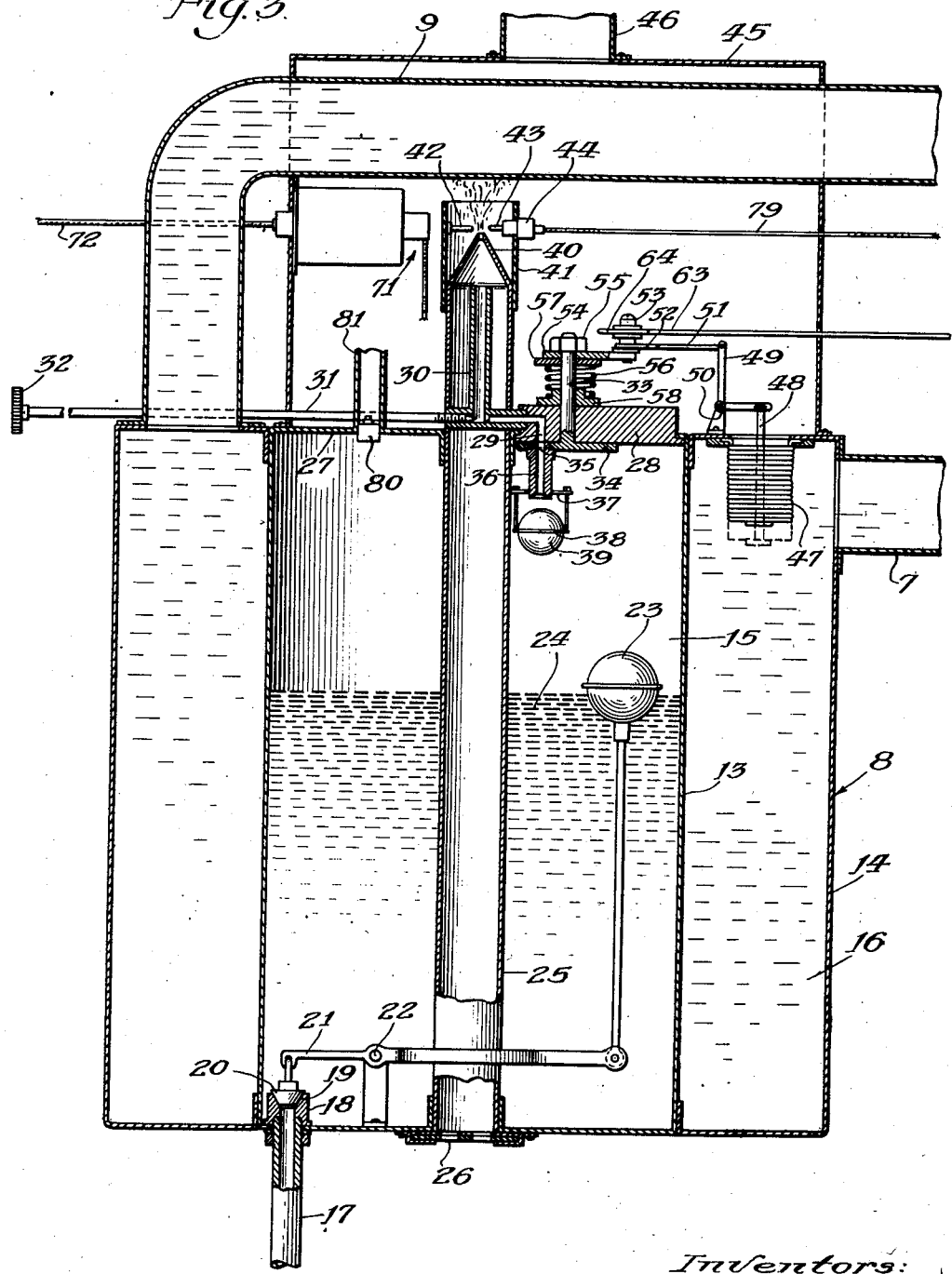

Oct. 7, 1941.   S. MORICI ET AL   2,257,755
HEATER FOR INTERNAL COMBUSTION ENGINE COOLING WATER
Filed Feb. 9, 1939   4 Sheets-Sheet 3

Inventors:
Salvatore Morici,
Pasqual P. Belvedere
By Lee J. Gary
Attorney

Oct. 7, 1941.  S. MORICI ET AL  2,257,755
HEATER FOR INTERNAL COMBUSTION ENGINE COOLING WATER
Filed Feb. 9, 1939  4 Sheets-Sheet 4
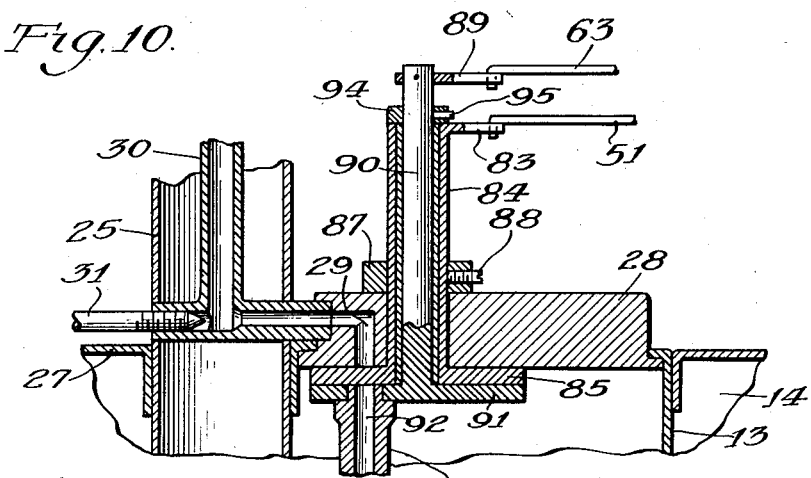
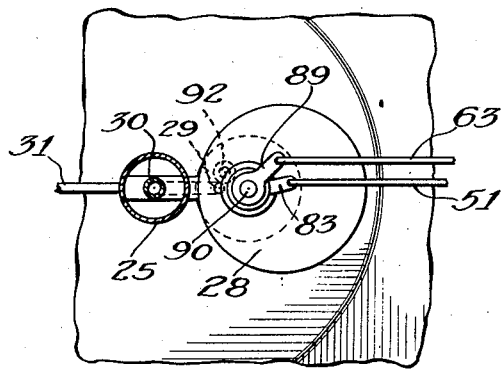
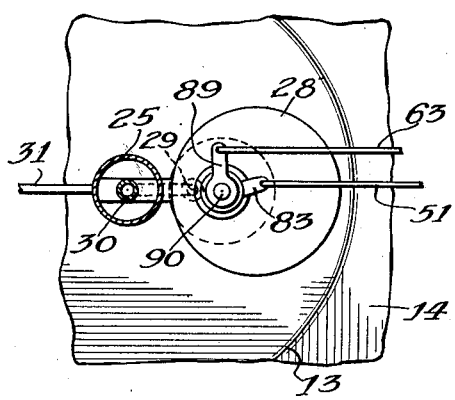
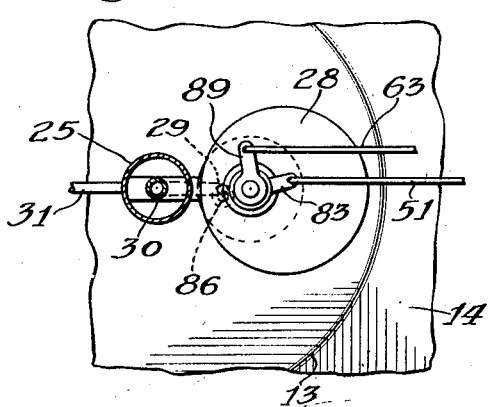
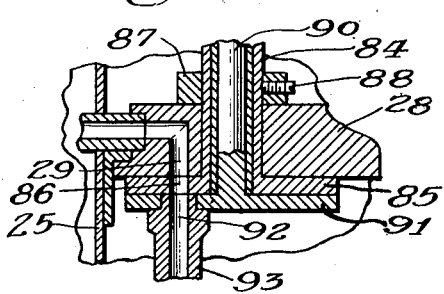
Inventors:
Salvatore Morici,
Pasqual P. Belvedere
By: Lee J. Gary
Attorney Patented Oct. 7, 1941

2,257,755

UNITED STATES PATENT OFFICE 2,257,755

HEATER FOR INTERNAL COMBUSTION ENGINE COOLING WATER

Salvatore Morici and Pasqual P. Belvedere, Chicago, Ill.

Application February 9, 1939, Serial No. 255,392

10 Claims. (Cl. 123—174)

This invention relates to improvements in a heater for the jacket water of an internal combustion engine and refers specifically to a heater of the class described which is actuated when the engine is stopped and is rendered inoperative when the engine is in operation to maintain the jacket water at a predetermined temperature.

One of the objects of our invention is to provide a mechanism for heating the jacket water of an internal combustion engine to a predetermined degree when the engine is inoperative, the mechanism being automatically rendered inoperative when the engine is started.

Another object of our invention is the provision of means for automatically actuating our heating mechanism when the internal combustion is shut off.

A further object of our invention is to provide a device for the heating of the engine jacket water wherein the heating action is automatically controlled by the temperature of the jacket water.

One of the important features of our invention resides in the use of a gasoline flame which utilizes as fuel gasoline vapor, the vapor being generated by the heat from the engine water.

Other and further objects of our invention will be apparent from the accompanying drawings and the following detailed description.

In the drawings, Fig. 1 is a diagrammatic side elevational view of our heater shown in conjunction with an automobile internal combustion engine.

Fig. 2 is a fragmentary detailed view of our heater in position when the engine is stopped.

Fig. 3 is an enlarged sectional view of the vapor generator and heater.

Fig. 10 is a detailed sectional view of a modified vapor control mechanism.

Fig. 11 is a top plan view of the device shown in Fig. 10, the parts being illustrated in "engine running" position.

Fig. 12 is a similar view showing the parts in "engine stopped" position when jacket water is cold.

Fig. 13 is a similar view showing the parts in "engine stopped" position when the jacket water is warm.

Fig. 14 is a sectional view of the vapor control device, the parts being in the position shown in Fig. 12.

Fig. 15 is a detailed sectional view of the vacuum operated piston and cylinder.

Figure 4:
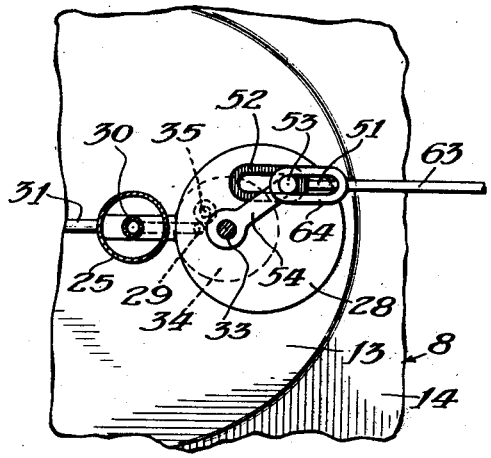
Fig. 4 is a diagrammatic top plan view of the vapor throttle in the "engine running" position.
Figure 5:
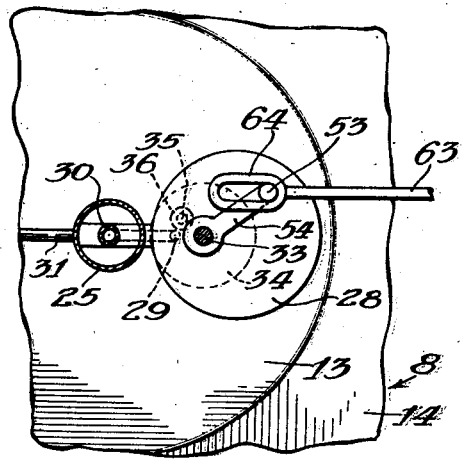
Fig. 5 is a similar view in the "engine stopped" position just before the thermostat acts.

Referring in detail to the drawings, 1 indicates a conventional internal combustion engine for an automobile, said engine having the usual intake manifold 2 connected to a carburetor 2'. Pipe 3' connects the carburetor to a source of gasoline supply (not shown). A conventional radiator 3 is used in conjunction with the engine 1, being connected to the water jacket of the engine by means of a flexible radiator hose 4 whereby the hot water from the engine jacket is passed to the top of the radiator. The bottom of the radiator 4 is connected by means of hose 5 to a pump 6 which is driven by means of the engine in the conventional manner.

The pump discharge instead of being connected directly to the lower portion of the engine jacket, is connected to a pipe 7 which, in turn, connects into a vapor generator 8. A discharge pipe 9 from the vapor generator connects with pipe 10 which, in turn, connects into the lower portion of the engine jacket. A branch pipe 11 controlled by valve 12 connects pipes 7 and 10 and serves as a by-pass or shunt for the vapor generator 8. If desired, valves (not shown) may be interposed in pipes 7 and 10 to completely disconnect the generator 8 from the engine jacket-radiator system.

The generator 8 comprises essentially an inner container 13 surrounded by a jacket 14 forming two compartments, an inner compartment 15 and an outer compartment 16. The generator may be of any desired cross-section but is preferably circular whereby the outer compartment 16 is annular. Pipe 7 connects into the outer compartment and is adapted to discharge water into said compartment. Pipe 9 also connects into compartment 16 whereby the water passes to the engine jacket.

A pipe 17 connects a source of supply of gasoline or other combustible fuel (not shown) to the inner compartment, a fitting 18 being secured to the bottom of the compartment and providing a valve seat 19 for a valve 20. The valve 20 is carried by an arm 21 which is mounted intermediate its length upon a fulcrum 22. The opposite end of arm 21 is connected to float 23 which acts to seat or unseat valve 20 to establish a predetermined level of fuel 24 within compartment 15.

A tube 25 is positioned in compartment 15 and passes through said compartment without connecting thereinto except as will be hereinafter described. At the lower end the tube connects to the atmosphere through a perforated slide valve 26 whereby the air admitted to said tube may be controlled. At the upper end of compartment 15 a closure 27 is provided, said closure being of increased section at a portion thereof as indicated at 28. The portion of increased thickness is bored as indicated at 29 whereby communication between the interior of compartment 15 and tube 25 may be established. A T-shaped fitting 30 is positioned in tube 25 and connects with the bore 29, one branch of the fitting extending parallel to the tube and being open at its end and the other branch of the fitting being threaded to receive the threaded end of rod 31. The rod 31 carries a knob 32 at one end, the manipulation of which controls the degree of communication between the bore 29 and upright portion of the tubular fitting 30.

A shaft 33 is journalled in the member 28 and carries a disc 34 at its lower end within the compartment 15. The disc 34 is provided with an eccentrically positioned aperture 35 which may be brought to coincidence with the bore 29 by rotating shaft 33. A tube 36 is secured to the bottom of disc 34 and extends downwardly therefrom, the bore of said tube being in communication with aperture 35. A bracket 37 is carried at the lower end of tube 36 and supports a cage 38 which confines a float 39. It can readily be seen that if valve 20 leaks or float 23 becomes stuck, the rising liquid 24 will cause float 39 to seat on the end of tube 36 thereby preventing the passage of liquid fuel through the tube 36.

The upper portion of tube 25 converges to form a burner 40, the opening of which is in alignment with the bore of fitting 30. A sleeve 41 surrounds the burner 39 and carries a pair of sparking terminals 42 and 43, the terminal 42 being grounded on the sleeve and the terminal 43 being insulated therefrom by the bushing 44. The gap formed by said terminals is located immediately above the burner opening. A hood 45 is positioned over a major portion of the top of the vapor generator, pipe 9 passing horizontally through said hood above the burner 40. The hood is provided with an outlet 46 whereby combustion gases from the burner 40 may be discharged to the atmosphere or to the exhaust pipe (not shown) of the automobile.

A thermostat 47 is positioned within the water compartment 16, said thermostat carrying an arm 48 which projects outside the compartment. Arm 48 is pivotally connected to bell-crank lever 49 which is pivoted upon the fulcrum 50 carried by top 27. A connecting rod or link 51 is pivotally connected at one end to the bell-crank lever 49 and at the other end terminates in a slotted head 52 which embraces pin 53 carried upon the end of arm 54. The arm 54 is rigidly connected to shaft 33 and is secured thereon by means of nut 55. A coil spring 56 is confined between washer 57 and a collar 58 and serves to maintain disc 34 in tight contact with the bottom of the member 28.

The operation of the thermostat 47 is as follows: When the water within the compartment 16 is cold, the thermostat 47 is contracted and the bell-crank lever 49, link 51 and arm 54 are so positioned as to bring the aperture 35 into coaxial relationship with the bore 29. As the water within the compartment 16 becomes warmer the thermostat 47 expands moving the bell-crank lever 49 and link 51 in such a manner as to offset aperture 35 from bore 29. The complete movement of thermostat 47, however, is such that the disc 34 will be moved from the concentric position of aperture 35 and bore 29 to an eccentric position of said aperture with respect to said bore, there always being a degree of communication between aperture 35 and bore 29 regardless of the heat of the water within the compartment 16. It can readily be seen that when the aperture 35 is in concentric position with the bore 29, there will be a free flow of gaseous fuel to the fitting 30 and a relatively large flame will be produced at the burner. As the water is heated by the flame, the thermostat 47 expands thereby shifting the disc 34 and decreasing the area of communication between the aperture 35 and the bore 29. This, in turn, lowers the flame at the burner and decreases the amount of heat imparted to the water in the system. In view of the fact that communication between the interior of the compartment 15 and the fitting 30 is never completely prevented, there will always be sufficient fuel passing through the fitting 30 to provide a flame at the burner.

The thermostat 47, however, only functions as a control when the engine 1 is not in operation. When the engine is in operation, means is actuated whereby the disc 34 is so moved as to completely close communication between the aperture 35 and the bore 29. This means will be hereinafter more fully described.

A pipe 59 connects at one end into the intake manifold 2. At the other end said pipe connects into a vacuum cylinder 60. The cylinder 60 carries a movable piston 59' which is connected to piston rod 61. When vacuum is established within the pipe 59, the piston rod 61 is adapted to be moved. This is a conventional type of mechanism and in itself forms no part of our invention. An arm 62 is carried at the end of piston rod 61, said arm being connected to link 63. At the opposite end of link 63, a slotted head 64 is carried which embraces pin 53 carried upon the crank arm 54.

The operation is such that when the engine 1 is started and a vacuum is established within the intake manifold 2, said vacuum, by means of the connecting pipe 59, moves piston 59' against spring 60' causing the piston rod 61 to move link 63. The link 63 in turn rotates pin 33 and so moves disc 34 as to completely close communication between the interior of compartment 15 and the bore 29.

A contact member 64 is carried by arm 62, said contact member being insulated from arm 62. A conductor 65 connects the contact member 64 to one side of a battery 66 or other source of electrical current. The opposite side of the battery is connected by means of conductor 67 to ground 68. A contact 69 is positioned adjacent contact member 64 and is connected by means of conductor 70 to a thermostatically operated switch 71. The opposite side of switch 71 is connected by means of conductor 72 to a signal light 73 which is positioned upon the instrument panel 74 of the automobile. The signal light 73 is connected by means of conductor 75 to hand operated switch 76 which, in turn, is connected by means of conductor 77 to a conventional spark coil 78. The spark coil 78 is connected by means of conductor 79 to the contact point 43 which is disposed opposite to the grounded contact point 42.

In the operation of the device when the motor is shut off the piston rod 61 moves outwardly from the cylinder 60 under the impulse of the spring 60' positioned within the cylinder 60. When the piston rod 61 so moves, contact member 64 connects with contact 69 and completes the circuit through the battery, the thermostatically operated switch 71, light 73, spark coil 78, and a spark is caused to flash across the opening of the burner 40. With the return of the piston rod 61 to its outward position, aperture 35 is again brought into communication with the bore 29 and vaporized fuel passes upwardly through the fitting 30. In this manner the fuel is ignited at the burner 40 and the water in the pipe 9 is maintained at a predetermined temperature. When the burner 40 is ignited, the thermostatically operated switch 71 becomes heated to a predetermined degree and acts to break the electrical circuit to the spark coil. When the circuit is thus broken the light 73 upon the dash which is illuminated during the time that the spark is passing across the gap at the burner goes out, informing the operator that the burner has been lit.

Figure 6:
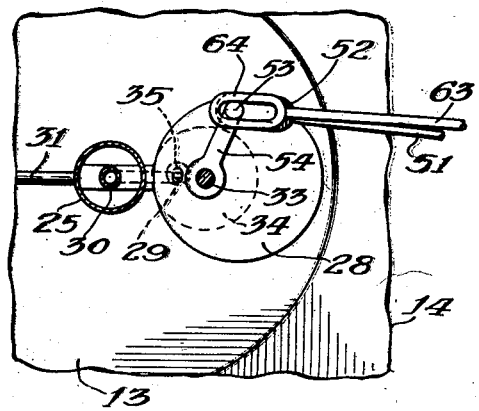
Fig. 6 is a similar view in the "engine stopped" position after the thermostat has acted.
Figure 8:
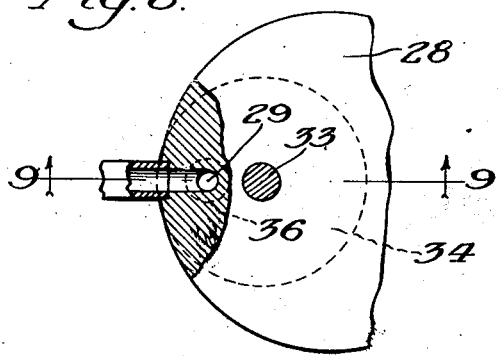
Fig. 8 is a fragmentary top plan view, parts being broken away and parts being shown in section, of the top of the vapor compartment.
Figure 9:
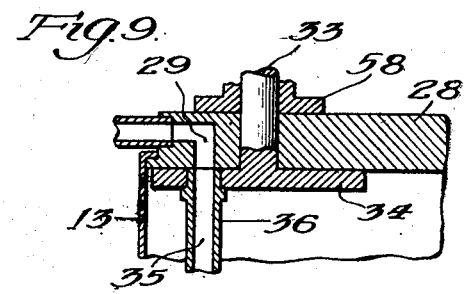
Fig. 9 is a sectional view taken on line 9—9 of Fig. 8.

Referring particularly to Figs. 4, 5, 6 and 7, the various positions of the disc 34 are shown. In the position shown in Fig. 4 the engine is running and the piston rod 61 has been moved inwardly with respect to the cylinder 60. This movement moves link 63 to the right as viewed in Fig. 4 whereby the pin 53 is carried to the right rotating disc 34 in such a manner as to position aperture 35 eccentric with respect to the bore 29. At this phase pin 53 is positioned intermediate the length of the aperture in the slotted head 52. When the motor is shut off the piston rod 61 moves outwardly from the cylinder 60, moving the link 63 to the left as viewed in Fig. 5 until pin 53 occupies a position at the opposite end of the slot in the slotted head 64. However, the movement of the head 64 normally does not move pin 53 a very great distance since the radiator water is warm at this period and, hence, head 52 has moved the pin clockwise as viewed in Fig. 5. Rod 63 continues its motion to the left beyond the position shown in Fig. 5 until the aperture 35 is brought into a degree of registration with the bore 29. The respective positions of the slotted heads 52 and 64 and the disc at this period are shown in Fig. 6. By the movement of the piston rod 61 the spark is caused to ignite the flame at the burner 40 as has been hereinbefore described and, consequently, the water within the pipe 9 is subjected to the heat of the burner. As the temperature varies thereafter the link 51 moves backwardly and forwardly in response to the thermostat 47 and depending upon the temperature of the water the aperture 35 communicates with the bore 29 through varying areas. This movement of pin 53 is permitted since said pin, when the water is hottest, is at the extreme left of the slotted head 64.

Figure 7:
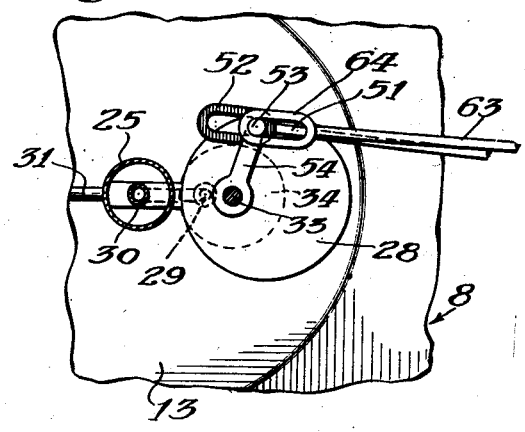
Fig. 7 is a similar view in the "engine stopped" position when the jacket water is cold.

When the engine is again started the water in the system may be relatively cool in which case aperture 35 will be in complete registration with bore 29 and the slotted heads 52 and 64 will be in the relative positions shown in Fig. 7. When the engine is started the rod 63 tends to move to the right as viewed in Fig. 7. However, in view of the fact that the pin 53 is at its limited position at the right in the slotted head 52, the thermostat link 51 will resist this movement. However, as the engine runs, the water becomes heated and the thermostat 47 expands thereby moving the slotted head 52 to the right and permitting the link 63 to move the disc 34 to the position shown in Fig. 4. At this period of operation the flame at the burner 40 goes out and the heating of the water in the system is accomplished by means of the internal combustion engine I. It can readily be seen, therefore, that the water within the cooling system of the engine I may be maintained at a relatively constant predetermined temperature irrespective of the atmospheric temperature.

The water passing into the compartment 16 circulates around the inner container 13 and passes outwardly through the pipe 9 into the jacket of the engine I. In view of the fact that the water surrounding the container 13 will always be relatively warm, the fuel 24 within the compartment 15 will be warmed thereby promoting vaporization of a portion of said fuel. This vapor passes outwardly through the fitting 13 and is burned at the burner 40. Air is mixed with said fuel within the conical portion of the burner 40, said air passing upwardly through the pipe 25. The amount of air may be controlled by the rotating valve 26 at the bottom of the pipe 25. The hot combustion gases may escape through the outlet pipe 46 at the top of the hood 45 and are preferably conducted to the exhaust pipe of the automobile. The fuel 24 in addition to being heated by the water which circulates in the compartment 16 is also heated by the conducted heat from the pipe 25 which further promotes vaporization of the fuel.

A relief valve 80 is provided in the top 27, said valve being adapted to open when the pressure within the compartment 15 above the fuel 24 reaches a predetermined maximum. The vapor thus discharged may be conducted by means of pipe 81 to the atmosphere or said vapors may be passed into the gasoline tank where the same are condensed. If desired said vapors may be conducted by means of the pipe 81 into the intake manifold or to a portion of the carburetor 2' through check valve 4'. In view of the fact that the vapors may thus be conserved, the relief valve 80 instead of being provided for merely purposes of safety may be utilized to maintain a substantially constant pressure within the compartment 15 and yet there will be no loss of fuel.

If during the warm months of the year there is no need for maintaining the water in a relatively warm condition when the engine is inoperative, the entire arrangement may be disconnected by closing valve 20 and the valves which may be positioned in the pipes 7 and 10; manipulating the knob 32 to cause rod 31 to seat upon the end of bore 29 and by disconnecting the hand switch 76. In addition, valve 82 in pipe 59 may be closed.

Referring particularly to Figs. 10, 11, 12, 13 and 14, a modified form of control means for the passage of vapors from the compartment 15 to the fitting 30 is illustrated. In this modification link 51 may be connected to arm 83 which, in turn, is rigidly connected to the sleeve 84. Sleeve 84 is journalled in the member 28 and carries at its lower end disc 85 which is provided with an aperture 86. A collar 87 having a set screw 88 may secure the disc 85 in snug position adjacent the upper face of the member 28.

Link 63 is connected to arm 89 which, in turn, is rigidly connected to a rod 90, which is positioned within the sleeve 84, said rod carrying at its lower end disc 91 which is provided with an aperture 92. A tube 93 is connected to the lower portion of disc 91 and carries a gauge and float arrangement (not shown) similar to that described in conjunction with Fig. 3. A collar 94 carrying set screw 95 functions to maintain the disc 91 in snug contact with the lower face of disc 85.

In this form of our invention, the disc 91, while the engine is inoperative, is so positioned as to bring aperture 92 into complete registration with the axis of bore 29. At this period the thermostat 47 acts to oscillate disc 85 in such a manner as to cause varying degrees of communication between the aperture 86 and aperture 92 and bore 29 depending upon the variation in the temperature of the water within the compartment 16. The complete throw of the thermostat 47, however, is such that aperture 86 will always be in communication with bore 29 and aperture 92 but the degree or area of communication will be varied with the temperature of the water. In this manner a flame will always be established at the burner 40. When the motor 1 is set in operation, piston rod 61 moves link 63 so as to move aperture 92 in disc 91 out of registration with bore 29. When such movement takes place, communication between the interior compartment 16 and the fitting 30 is entirely broken and the flame is thereby extinguished.

In Fig. 11 the position of the arms 83 and 89 and aperture 92 is illustrated when the motor is in operation. In Fig. 12 the position of the arms is shown when the motor is inoperative and when the water in the system is in a relatively cool condition. In this position the apertures 86 and 92 are in complete registration with the bore 29 and the full volume of gas passes through the fitting 30. In Fig. 13 the position of the arms and aperture 86 is shown when the engine is inoperative and the water within the compartment 16 is relatively warm. At this period aperture 92 is in complete registration with bore 29 but aperture 26 is slightly offset or eccentric with respect to aperture 92 and bore 29.

It can readily be seen that our device is completely automatic and adequately provides for all conditions which may be met. The device is rendered temporarily inoperative when the engine is in operation and is substantially immediately set into operation when the engine is rendered inoperative. It remains in operation to maintain the engine water at a substantially constant elevated temperature, the heating means being intensified as the water cools and being reduced as the water becomes warmer. When the engine starts the cycle again commences.

It is to be understood that, although the pipe 9 is illustrated as the usual tubular pipe, above the flame the pipe 9 may take the form of a coil of smaller pipe so as to expose a greater surface area to the hot combustion gases and thus facilitate heat transfer to the water. In addition, pipe 46 instead of discharging into the atmosphere or into the automobile exhaust pipe, may connect into the compartment of the car whereby the heat under hood 45 may be utilized. In this case it is desirable that a blower (not shown) be connected into the pipe 46 and an air inlet be provided in the hood 45, so that the air drawn through the pipe 46 by the blower will not be drawn through the burner 40.

We claim as our invention:

1. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, means connecting said burner with said fuel container whereby gaseous fuel passes from the fuel container to the burner, and means for controlling the passage of gaseous fuel from the fuel container to the burner.

2. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes under pressure from the fuel container to the burner, and thermostatic means for controlling the passage of gaseous fuel from the fuel container to the burner.

3. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes under pressure from the fuel container to the burner, and means responsive to the temperature of the water in the cooling system for controlling the passage of gaseous fuel from the fuel container to the burner.

4. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes under pressure from the fuel container to the burner, means for controlling the passage of gaseous fuel from the fuel container to the burner, and separate means for closing communication from the fuel container to the burner.

5. A heater for the cooling water of an internal combustion engine which comprises in combination, a container for a relatively volatile combustible fuel, a container for engine cooling water in heat interchange relationship with said fuel container whereby a portion of said fuel is vaporized, connections into said water container from the internal combustion engine cooling system, a burner disposed in heating relation to the water of the cooling system, said burner being in communication with said fuel container whereby gaseous fuel passes from the fuel container to the burner, means for controlling the passage of gaseous fuel from the fuel container to the burner, and means responsive to the vacuum in the intake manifold of the engine for closing communication from the fuel container to the burner.

6. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes from the fuel container to the burner, and means responsive to the vacuum in the intake manifold of the engine for closing communication from the fuel container to the burner.

7. A heater for the cooling water of an internal combustion engine which comprises in combination, a container for a relatively volatile combustible fuel, a container for engine cooling water in heat interchange relationship with said fuel container whereby a portion of said fuel is vaporized, connections into said water container from the internal combustion engine cooling system, a burner disposed in heating relation to the water of the cooling system, said burner being in communication with said fuel container whereby gaseous fuel passes from the fuel container to the burner, and means responsive to the vacuum in the intake manifold of the engine for closing communication from the fuel container to the burner, said last mentioned means comprising a cylinder, a piston slidably positioned in said cylinder, a connection from the intake manifold to said cylinder, a valve controlling passage of gaseous fuel from the fuel container to the burner, and a connection between said piston and said valve.

8. A heater for the cooling water of an internal combustion engine which comprises in combination, a container for a relatively volatile combustible fuel, a container for engine cooling water in heat interchange relationship with said fuel container whereby a portion of said fuel is vaporized, connections into said water container from the internal combustion engine cooling system, a burner disposed in heating relation to the water of the cooling system, said burner being in communication with said fuel container whereby gaseous fuel passes from the fuel container to the burner, spark contacts positioned adjacent said burner, an electrical circuit for said spark contacts, a switch for closing said electrical circuit of said spark contacts to cause spark there across, and means responsive to the vacuum in the intake manifold of the engine for closing communication from the fuel container to the burner, said switch being actuated by said vacuum responsive means to close the circuit of the spark contacts when the vacuum is broken.

9. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes from the fuel container to the burner, spark contacts positioned adjacent said burner, an electrical circuit for said spark contacts, means for closing said circuit to cause a spark to jump across said contacts and ignite the fuel issuing from the burner, and a thermostatically operated switch disposed adjacent said burner and connected in said electrical circuit for opening said circuit when said burner gives off a predetermined amount of heat.

10. A heater for the cooling water of an internal combustion engine which comprises in combination, a container for a bulk supply of relatively volatile combustible fuel, a container for engine cooling water in heat interchange relationship with said fuel container whereby an atmosphere of vaporized fuel is formed in said fuel container, connections into said water container from the internal combustion engine cooling system, a burner disposed in heating relation to the water of the cooling system, said burner being in communication with said fuel container whereby gaseous fuel passes from the fuel container to the burner, means for controlling the passage of gaseous fuel from the fuel container to the burner, and means for maintaining the pressure in said fuel container below a predetermined maximum.

SALVATORE MORICI.
PASQUAL P. BELVEDERE.